(12) United States Patent
Augustine et al.

(10) Patent No.: US 9,916,884 B2
(45) Date of Patent: Mar. 13, 2018

(54) PHYSICALLY UNCLONABLE FUNCTION CIRCUIT USING RESISTIVE MEMORY DEVICE

(71) Applicant: Intel Corporation, Santa Clara, CA (US)

(72) Inventors: Charles Augustine, Hillsboro, OR (US); Carlos Tokunaga, Hillsboro, OR (US); James W. Tschanz, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/115,461

(22) PCT Filed: Mar. 7, 2014

(86) PCT No.: PCT/US2014/021696
§ 371 (c)(1),
(2) Date: Jul. 29, 2016

(87) PCT Pub. No.: WO2015/134037
PCT Pub. Date: Sep. 11, 2015

(65) Prior Publication Data
US 2017/0178710 A1    Jun. 22, 2017

(51) Int. Cl.
*G11C 11/16* (2006.01)
*H03M 1/12* (2006.01)
*G11C 13/00* (2006.01)

(52) U.S. Cl.
CPC .......... *G11C 11/1695* (2013.01); *G11C 11/16* (2013.01); *G11C 13/004* (2013.01); *H03M 1/12* (2013.01)

(58) Field of Classification Search
CPC .... G11C 13/0069; G11C 13/004; G11C 11/16
USPC ................................. 365/148, 158
See application file for complete search history.

(56) References Cited

U.S. PATENT DOCUMENTS

| | | | |
|---|---|---|---|
| 8,773,887 B1 * | 7/2014 | Naji | 365/148 |
| 2010/0091562 A1 | 4/2010 | Chen et al. | |
| 2012/0235720 A1 | 9/2012 | Jiang et al. | |
| 2014/0119096 A1 * | 5/2014 | Kwon et al. | 365/148 |

FOREIGN PATENT DOCUMENTS

| | | |
|---|---|---|
| EP | 0798864 | 5/2002 |
| WO | 2008/052082 | 5/2008 |

OTHER PUBLICATIONS

Notification Concerning Transmittal of International Preliminary Report on Patentability issued for International Patent Application No. PCT/US2014/021696, dated Sep. 22, 2016.

(Continued)

*Primary Examiner* — Son Mai
(74) *Attorney, Agent, or Firm* — Womble Bond Dickinson (US) LLP

(57) ABSTRACT

Described is a physically unclonable functional circuit comprising: a resistive memory device (e.g., an MTJ device) having at least two terminals; a transistor coupled to one of the at least two terminals of the resistive memory device; and an analog-to-digital converter (ADC) having an input coupled to the one of the at least two terminals of the resistive memory device.

18 Claims, 7 Drawing Sheets

(56) References Cited

OTHER PUBLICATIONS

Maes, Roel., "Physcially Unclonable Functions: Concepts and Constructions," Physically Unclonable Functions, Ch. 2, pp. 11-48, 2013.
Maes, R., "Physically Unclonable Functions: Concept and Constructions", Dec. 2013, accessed at: http://rd.springer.com/chapter/10.1007%2F978-3-642-41395-7_2 on Jan. 20, 2015, pp. 11-48.
International Search Report for PCT/US2014/021696 dated Jan. 29, 2015, 3 pages.
Written Opinion of the International Searching Authority for PCT/US2014/021696 dated Jan. 29, 2015, 4 pages.

* cited by examiner

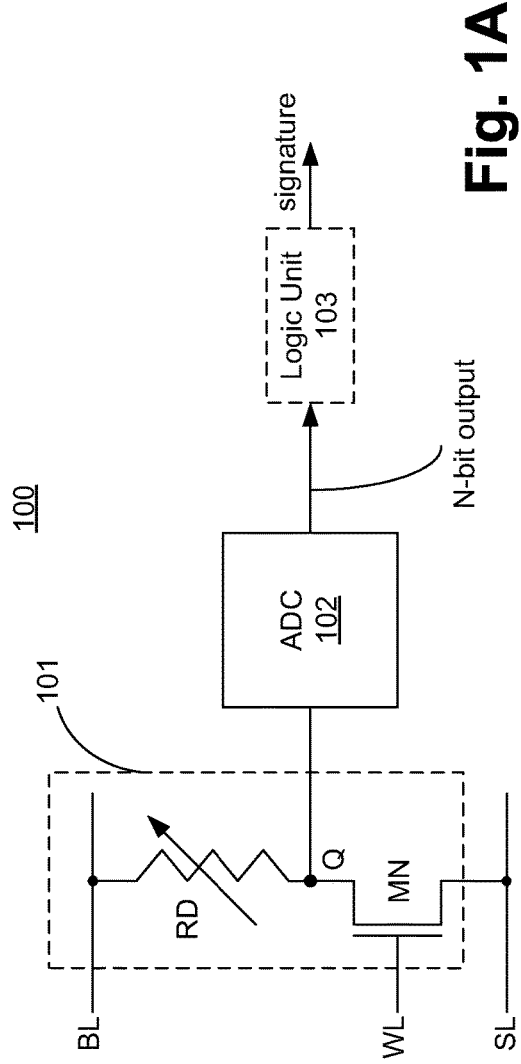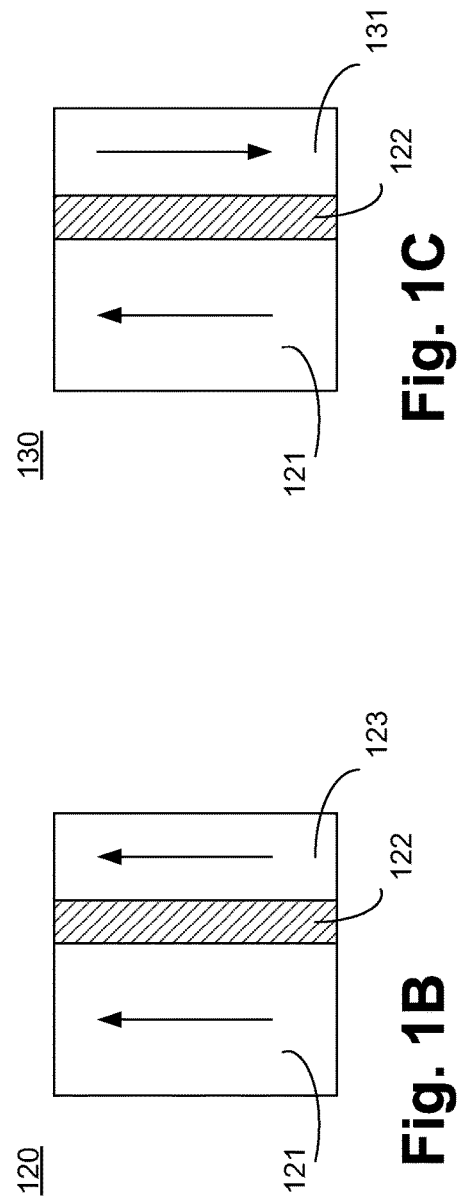

PHYSICALLY UNCLONABLE FUNCTION CIRCUIT USING RESISTIVE MEMORY DEVICE

RELATED APPLICATION

This patent application is a U.S. National Phase Application under 35 U.S.C. § 371 of International Application No. PCT/US2014/021696, filed Mar. 7, 2014, entitled PHYSICALLY UNCLONABLE FUNCTION CIRCUIT USING RESISTIVE MEMORY DEVICE.

BACKGROUND

Generation of random and unique one-time encryption keys is challenging especially when the keys are locally generated and not distributed by a master key management system. In the same way, unique identification of products/parts is a difficult challenge faced by the manufacturing industry to authenticate parts in order to avoid rogue products being supplied to the market.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 1A illustrates a Physically Unclonable Function (PUF) circuit using a single resistive memory device, according to one embodiment of the disclosure.

FIG. 1B illustrates a magnetic tunneling junction (MTJ) based resistive memory device with low resistance.

FIG. 1C illustrates an MTJ based resistive memory device with high resistance.

DETAILED DESCRIPTION

Figure 2:
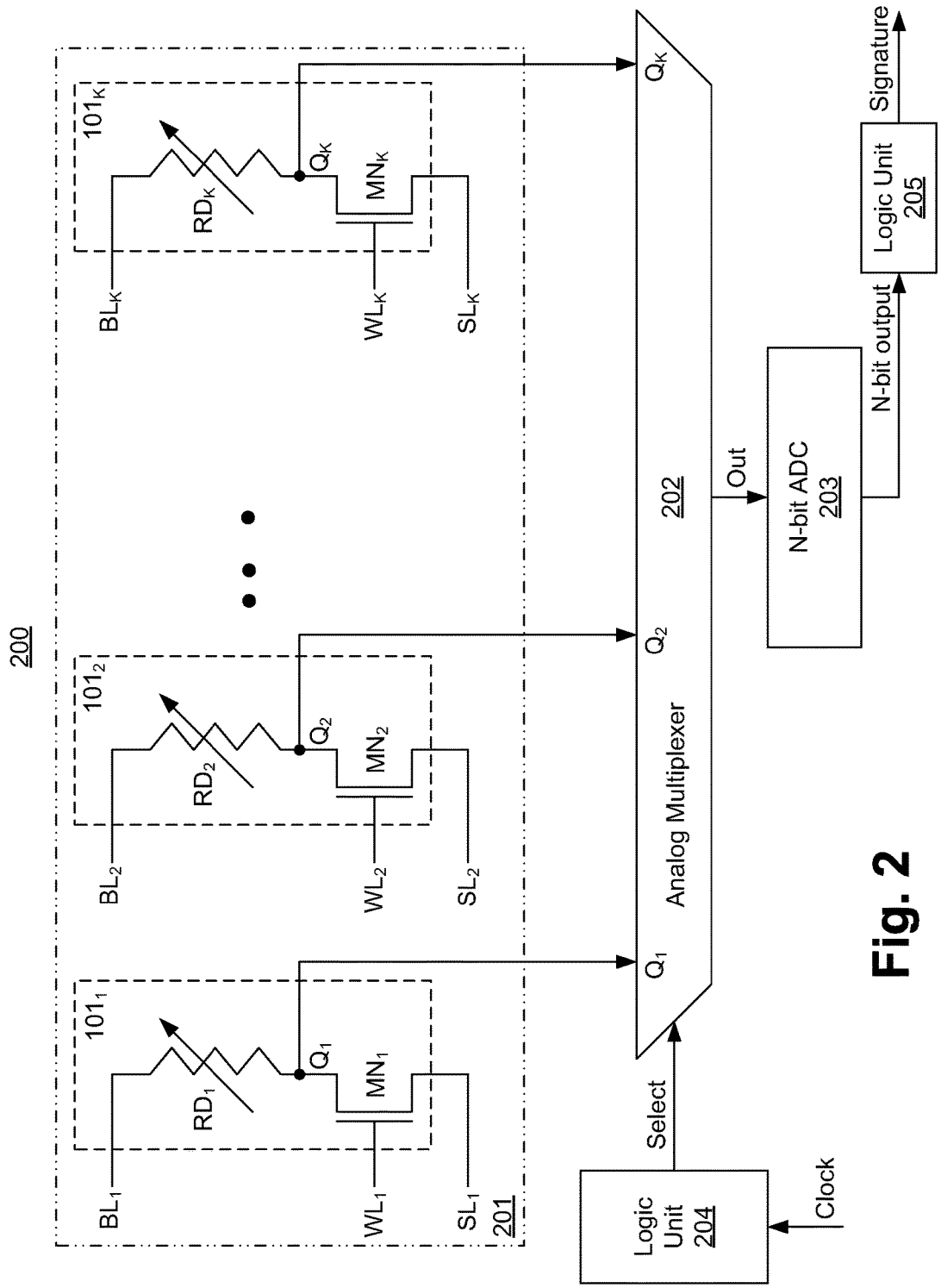
FIG. 2 illustrates a PUF circuit with multiple resistive memory devices, according to one embodiment of the disclosure.

Several methods that address both of these applications have been proposed. One of the most common techniques is called Physically Unclonable Functions (PUFs). In PUFs, physical variation due to manufacturing is exploited to generate a unique ID or key. In integrated circuits (ICs), such variations are prominent and can be effectively exploited to build integrated PUF circuits. Due to their integrated nature, it is difficult to reverse engineer and identify the underlying circuit and reproduce the PUF nature in a rogue circuit.

As a result, many ICs supplied to customers have embedded PUF circuits. PUF circuits face challenges. For example, FRR which is false rejection rate where a correct chip is identified as a rogue chip, and FAR which is false acceptance rate where a rogue chip is identified as a correct chip. FAR and FRR can be estimated based on parameters such as—$\mu$-inter, $\mu$-intra, $\sigma$-inter and $\sigma$-intra. In circuit based PUFs (e.g., in 0.35 $\mu$m process node) $\mu$-inter can be achieved close to 1.3% (ideal: 0%) and $\mu$-intra can be achieved close to 50% (ideal: 50%). Known PUF circuits use transistor threshold voltage variations to generate a signature. However, in scaled geometries, PUF performance decreases and an alternate scheme is needed to achieve the ideal PUF performance.

Some embodiments describe a PUF circuit comprising: a resistive memory device having at least two terminals; a transistor coupled to one of the at least two terminals of the resistive memory device; and an analog-to-digital converter (ADC) having an input coupled to the one of the at least two terminals of the resistive memory device. Some embodiments describe a PUF circuit comprising: a plurality of resistive memory device based bit-cells, each bit-cell independently controllable; an analog multiplexer coupled to each bit-cell; and an ADC to convert an output of the analog multiplexer to a digital representation.

Some embodiments describe a plurality of resistive memory device based bit-cells, each resistive memory device based bit-cell independently controllable, and each resistive memory device based bit-cell having first and second terminals such that the first terminal is coupled to a resistive memory device and the second terminal is coupled to a transistor; and an auto-zeroing comparator having an input coupled to one of the first or second terminals of all resistive memory device based bit-cells. Some embodiments describe an array of PUF circuits described above.

The unique random outputs that PUFs generate can also be used as one time encryption keys or master keys. The advantage of these types of keys is that they are unique to every PUF and completely unknown to external parties, even the manufacturing parties. In one embodiment, the resistive memory device used for the PUF circuit is a magnetic tunnel junction (MTJ) based device. In other embodiments, other types of resistive memory devices may be used. For example, phase change memory (PCM). Due to manufacturing variations, the MTJ based device resistance varies and in one embodiment the resistance difference can be identified using a current sensor/voltage sensor. In one embodiment, the sensor values can be used to generate challenge-response pairs (CRP) for authenticating the integrated circuits.

Compared to conventional PUFs, the embodiments offer several advantages. For example, the embodiments result in smaller physical dimension and 3-D integration of the MTJ. This enables higher bits being integrated, which increases the signature length and correspondingly signature strength. Compared to conventional PUF circuits, MTJ based PUF circuits can be physically smaller, while achieving identical or better FAR and FRR than conventional PUFs circuits. Another advantage of some embodiments is the exponential dependence of resistance on the variation parameter (here, thickness of MgO of the MTJ device) which provides larger variation from one MTJ device to the next MTJ device, creating a unique signature which can be measured without error and hence creates $\mu$-inter and $\sigma$-inter closer to zero. This can further decrease the PUF circuit area, compared to conventional implementation, which needs higher number of signature bits to achieve identical FAR and FRR.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nanotubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1A illustrates a PUF circuit 100 using a single resistive memory device, according to one embodiment of the disclosure. In one embodiment, PUF circuit 100 comprises a resistive memory device based cell 101, ADC 102, and Logic Unit 103. In one embodiment, Logic Unit 103 is optional. In one embodiment, cell 101 includes a resistive memory device RD coupled in series with a transistor. In one embodiment, the transistor is an n-type transistor MN. In other embodiments, other types of transistors may be used. In one embodiment, cell 101 has three terminals—one coupled to the resistive memory device RD, and the other two coupled to the transistor. Cell 101 resembles a memory bit-cell, and so the first, second, and third terminals are labeled BL (i.e., bit-line), SL (i.e., source-line), and WL (i.e., word-line). However, the labels do not mean that cell 101 has to reside in the memory of a processor. In one embodiment, PUF 100 can reside anywhere in the processor which is to be authenticated.

For purposes of explaining the embodiments, an MTJ based resistive memory device is considered for RD. In other embodiments, other types of resistive memory devices may be used. MTJ device exhibits two non-volatile states that are characterized as high resistance (RH) state and low resistance (RL) state. The resistance between RH and RL states is captured using a parameter referred to as Tunneling Magnetic Resistance (TMR) which is expressed as TMR= (RH−RL)/RL*100%. In one embodiment, the fixed magnetic layer of the MTJ device is coupled to the transistor while the free magnetic layer of the MTJ device is coupled to BL.

FIG. 1B illustrates an MTJ based resistive memory device 120 with low resistance. MTJ device 120 comprises two magnetic layers 121 and 123 (that form the two terminals of the MTJ device 120) separated by an insulating layer 122. In one embodiment, the insulating layer is formed from MgO. One of the magnetic layers (i.e., layer 121) is a fixed (or pinned) layer while the other magnetic layer (i.e., layer 123) is a free layer. MTJ resistance is an exponential function of state of the MTJ and the thickness of the embedded MgO layer 122 between layers 121 and 123. Due to this exponential dependence, an MTJ device with a different MgO thickness has a different resistance, which in one embodiment can be identified using current/voltage sensors. In the example of MTJ device 120, both free and fixed magnetic layers have the same magnetic direction caused by the direction of flow of current through the MTJ device. The same magnetic direction results in low resistance RL for MTJ device 120. FIG. 1C illustrates an MTJ based resistive memory device 130 with high resistance. In this example, the free 131 and fixed 121 magnetic layers have opposite magnetic directions resulting in a high resistance RH for MTJ device 130.

Referring back to FIG. 1A, in one embodiment, the junction between RD and transistor MN (i.e., node Q) is coupled to ADC 102. In one embodiment, when BL is coupled to a power supply and SL is coupled to ground, an analog voltage is developed on node Q. The magnitude of this analog voltage depends on the thickness of MgO. As MgO varies between MTJ devices, the analog voltage on node Q also varies. In one embodiment, the analog voltage on node Q is converted to an N-bit digital output using ADC 102. In one embodiment, the N-bit digital output is received by Logic Unit 103 which converts the N-bit digital output into an authentication signature.

For example, Logic Unit 103 may apply an encryption algorithm to the N-bit digital output to generate an encrypted signature. In one embodiment, the N-bit digital output can be used directly as an authentication signature. In one embodiment, the signature is strengthened by increasing the precision of ADC 102 to produce a larger number of digital bits. In one embodiment, an array of 101 and ADC 102 may be used to generate a longer signature to improve signature strength.

FIG. 2 illustrates a PUF circuit 200 with multiple resistive memory devices, according to one embodiment of the disclosure. It is pointed out that those elements of FIG. 2 having the same reference numbers (or names) as the elements of any other figure can operate or function in any manner similar to that described, but are not limited to such.

In one embodiment, PUF circuit 200 comprises an array of multiple MTJ based memory cells 201, an Analog Multiplexer (Mux) 202, N-bit ADC 203, and Logic Units 204 and 205. In one embodiment, array 201 comprises 'K' MTJ based memory cells $101_{1-K}$, where 'K' is an integer greater than one. In one embodiment, each of the MTJ based memory cells $101_{1-K}$ receives respective BL signal (i.e., from $BL_{1-K}$), SL signal (i.e., from $SL_{1-K}$), and WL signal (i.e., from $WL_{1-K}$). In one embodiment, MTJ devices $RD_{1-K}$ vary from each other in that the thickness of MgO varies. In one embodiment, each transistor $MN_{1-K}$ has the same size. In other embodiments, each transistor $MN_{1-K}$ may have a different size. Each MTJ based memory cell (e.g., $101_1$) is the same as MTJ based memory cell 101 of FIG. 1.

Referring back to FIG. 2, Analog Mux 202 receives inputs $Q_{1-K}$ from MTJ based memory cells $101_{1-K}$ respectively. Here, labels for nodes, signals, inputs/outputs are interchangeably used. For example, $Q_1$ may refer to node $Q_1$, input $Q_1$, or signal $Q_1$ depending on the context of the sentence. In one embodiment, Analog Mux 202 is implemented using pass-gates controllable by Select signal on Select line. In this embodiment, Analog Mux 202 is a K:1 multiplexer. In one embodiment, Select signal is controlled by Logic Unit 204 that receives a Clock signal. In one embodiment, Logic Unit 204 comprises a K-bit counter to cause Select signal to select one of $Q_{1-K}$ inputs as Out every Clock cycle.

In one embodiment, output of Analog Mux 202 is received by N-bit ADC that converts the analog output Out to an N-bit digital output that represents the analog output Out. In one embodiment, the N-bit output is received by Logic Unit 205 that converts the N-bit output into an authentication Signature. In one embodiment, Logic Unit 205 includes encryption logic. In one embodiment, N-bit output from N-bit ADC 203 is directly used as Signature. In such an embodiment, Logic Unit 205 may be bypassed or removed. In the embodiment, of FIG. 2, by using different combinations of Select lines over different Clock cycles, strength of the Signature can be improved. In one embodiment, the strength of the Signature can also be strengthened by independently adjusting voltages to $BL_{1-K}$ and $SL_{1-K}$. In one embodiment, $BL_{1-K}$ is coupled to power supply and $SL_{1-K}$ is coupled to ground.

Figure 3:
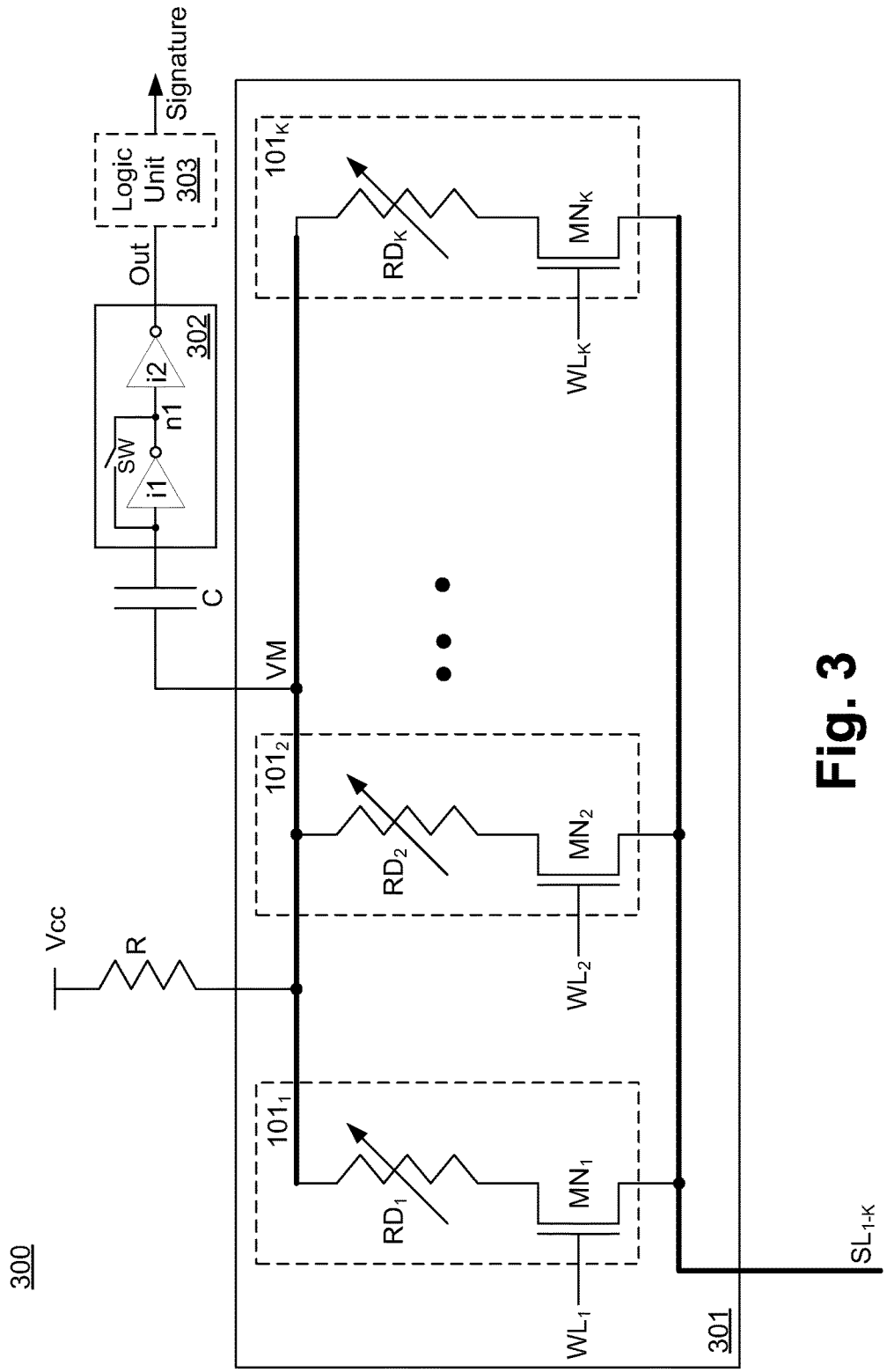
FIG. 3 illustrates a PUF circuit with multiple resistive memory devices and an auto-zeroing comparator, according to one embodiment of the disclosure.

FIG. 3 illustrates a PUF circuit 300 with multiple resistive memory devices and an auto-zeroing comparator, according to one embodiment of the disclosure. It is pointed out that those elements of FIG. 3 having the same reference numbers (or names) as the elements of any other figure can operate or function in any manner similar to that described, but are not limited to such.

In one embodiment, PUF circuit 300 comprises an array 301 of MTJ based memory cells $101_{1-K}$, auto-zeroing comparator 302, and Logic Unit 303. In this embodiment, ADC is removed. In one embodiment, Array 301 is similar to Array 201. In one embodiment, $BL_{1-K}$ (not labeled in FIG. 3) are coupled to power supply Vcc via resistor R. In one embodiment, $SL_{1-K}$ (not labeled in FIG. 3) are coupled to ground. In another embodiment, $SL_{1-K}$ may be coupled to a voltage higher or lower than ground (e.g., 10 mV higher or lower than ground). In one embodiment, auto-zeroing comparator 302 is coupled to $BL_{1-K}$ via capacitor C. In one embodiment, auto-zeroing comparator 302 is a current based comparator. In one embodiment, auto-zeroing comparator 302 is a voltage based comparator.

In one embodiment, auto-zeroing comparator 302 comprises inverters i1 and i2 coupled together in series such that input of inverter i1 is coupled to capacitor C, output (i.e., node n1) of inverter i1 is coupled to input of inverter i2, and output of inverter i2 is coupled to output node of the comparator. In one embodiment, a switch SW is coupled in parallel to inverter i1. In one embodiment, switch SW is an n-type transistor. In one embodiment, switch SW is a p-type transistor. In one embodiment, switch SW is a combination of both n-type and p-type transistors. In one embodiment, output Out of auto-zeroing comparator 302 is received by Logic Unit 303 which converts the Out signal to an authentication Signature.

In one embodiment, based on combination of activated $WL_{1-K}$ (i.e., WLs that turn on their respective transistors), a VM voltage is generated which is compared against VM' generated from a previous iteration. An iteration here, refers to a state in which a code for $WL_{1-K}$ is selected. In the next iteration, a different code of $WL_{1-K}$ is selected. In one embodiment, a Logic Unit (not shown) traverses a number of iterations to change codes of $WL_{1-K}$. In each iteration, a one bit output Out is generated.

In one embodiment, the previous VM' is stored on node n1 of the auto-zeroing comparator and is compared by auto-zeroing comparator 302 when switch SW is closed (i.e., node n1 is shorted to input of inverter i1). In one embodiment, when voltage on VM is greater than voltage on VM', Out is logic high else Out is logic low. Due to exponential dependency of current on MgO thickness, VM voltages are significantly different in every iteration. In one embodiment, each iteration results in one output bit on node Out, and 'N' iterations produce 'N' output bits which become the length of the Signature.

Figure 4:
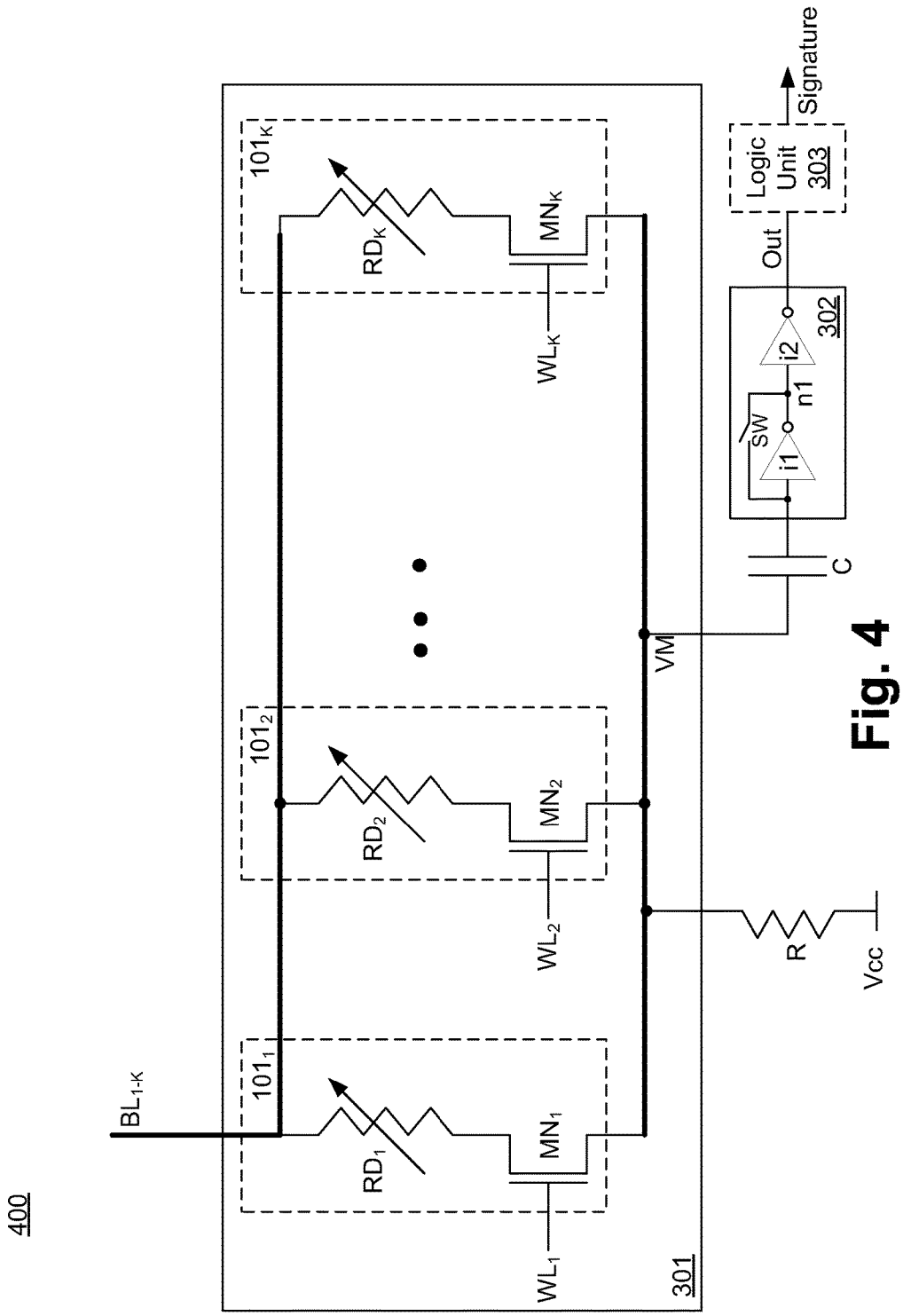
FIG. 4 illustrates a PUF circuit with multiple resistive memory devices and an auto-zeroing comparator, according to another embodiment of the disclosure.

FIG. 4 illustrates a PUF circuit 400 with multiple resistive memory devices and an auto-zeroing comparator, according to another embodiment of the disclosure. It is pointed out that those elements of FIG. 4 having the same reference numbers (or names) as the elements of any other figure can operate or function in any manner similar to that described, but are not limited to such.

So as not to obscure the embodiment of FIG. 4, differences between FIG. 3 and FIG. 4 are discussed. In PUF circuit 400, SL is coupled to auto-zeroing comparator 302 instead of BL. In this embodiment, $BL_{1-K}$ is coupled to ground. In one embodiment, $BL_{1-K}$ is coupled to a node higher or lower than ground (e.g., 10 mV above or below ground). In one embodiment, SL is coupled to power supply Vcc via resistor R. The operation of PUF 400 is other wise similar to PUF circuit 300.

Figure 5:
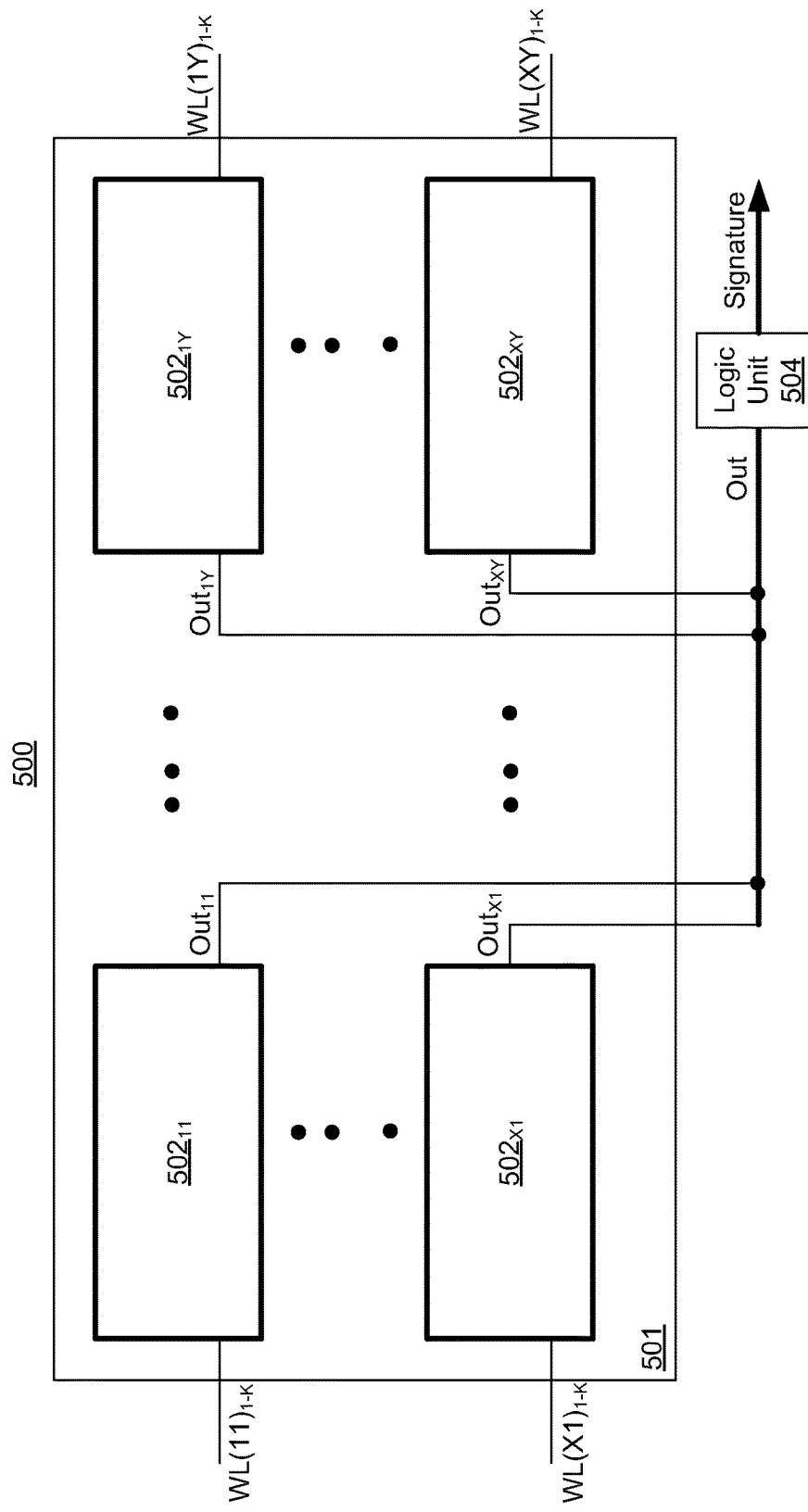
FIG. 5 illustrates a PUF circuit with an array of PUF circuits of FIG. 3 or FIG. 4, according to another embodiment of the disclosure.

FIG. 5 illustrates a PUF circuit 500 with an array of PUF circuits of FIG. 3 or FIG. 4, according to another embodiment of the disclosure. It is pointed out that those elements of FIG. 5 having the same reference numbers (or names) as the elements of any other figure can operate or function in any manner similar to that described, but are not limited to such.

In one embodiment, PUF circuit 500 comprises an X by Y array of PUF circuits 501, where the array includes PUF circuits 300 and/or 400 in each of blocks $502_{11\text{-}XY}$, where 'X' and 'Y' are integers greater than one. Output $Out_{11\text{-}XY}$ of each block $502_{11\text{-}XY}$ is combined to form Out bus which is then received by Logic Unit 504 to generate an authentication Signature. In one embodiment, each block $502_{11\text{-}XY}$ receives its respective WL enable signals. For example, $502_{11}$ receives $WL(11)_{1\text{-}K}$; $502_{1Y}$ receives $WL(1Y)_{1\text{-}K}$; $502_{X1}$ receives $WL(X1)_{1\text{-}K}$; and $502_{XY}$ receives $WL(XY)_{1\text{-}K}$. In one embodiment, Logic Unit 504 includes logic to encrypt Out to generate an authentication signature. In one embodiment, Logic Unit 504 is optional. In such an embodiment, Out is the authentication Signature.

In the embodiment of FIG. 4, Signature is generated over multiple clock cycles or multiple iterations such that in each iteration, one or more of WL bits from among $WL_{1\text{-}K}$ are changed. Referring back to FIG. 5, PUF circuit 500 reduces the number of iterations to a single iteration by generating a Signature by providing different $WL_{1\text{-}K}$ setting for each of $502_{11\text{-}XY}$ in one clock cycle by and combining outputs $Out_{11\text{-}XY}$ as Out. In this embodiment, the strength of the Signature is a function of size of array i.e., X by Y. In one embodiment, PUF circuit 300/400 can be used when area is the primary constraint while PUF circuit 500 can be used where performance (i.e., speed) is the primary constraint.

In some embodiments, PUF circuits discussed here can operate in a challenge-response mode. Here, challenge refers to a given input (e.g., WL enable signal) and response is the output Out. In these embodiments, a certain input to the PUF circuit provides a certain signature output. For example, the WL enable signals in PUF circuit 300/400 can be used as the input challenge and the VM voltage resulting from the combination of MTJ bit-cells can be converted with an ADC instead of an auto-zeroing comparator to provide the signature response.

While the disclosure has been described in conjunction with specific embodiments thereof, many alternatives, modifications and variations of such embodiments will be apparent to those of ordinary skill in the art in light of the foregoing description. For example, n-type device instead of p-type device may be coupled with the resistive memory device. One such embodiment is described with reference to FIG. 6.

Figure 6:
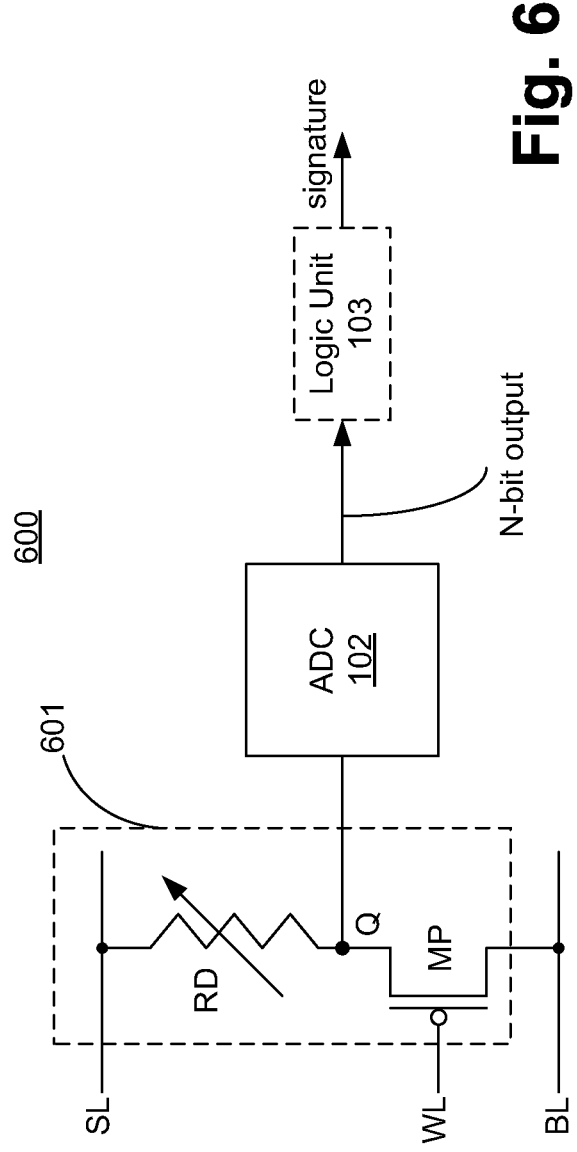
FIG. 6 illustrates a PUF circuit using a single resistive memory device, according to another embodiment of the disclosure.

FIG. 6 illustrates a PUF circuit 600 using a single resistive memory device, according to another embodiment of the disclosure. It is pointed out that those elements of FIG. 6 having the same reference numbers (or names) as the elements of any other figure can operate or function in any manner similar to that described, but are not limited to such.

FIG. 6 illustrates a PUF circuit 600 with a memory bit-cell 601 which is functionally similar to bit-cell 101 of FIG. 1A. The embodiment of FIG. 6 is similar to the embodiment of FIG. 1A, except that BL is now coupled to a p-type transistor MP while SL is coupled to the resistive memory device RD (e.g., MTJ based device). In one embodiment, the fixed magnetic layer of the MTJ device is coupled to the transistor MP while the free magnetic layer of the MTJ device is coupled to SL. Functionally, the embodiment of FIG. 6 is equivalent to the embodiment of FIG. 1A. In one embodiment, the memory bit-cell 601 may be used for bit-cells $101_{1\text{-}K}$ (as $601_{1\text{-}K}$) for FIGS. 2-5. The embodiments of the disclosure are intended to embrace all such alternatives, modifications, and variations as to fall within the broad scope of the appended claims.

Figure 7:
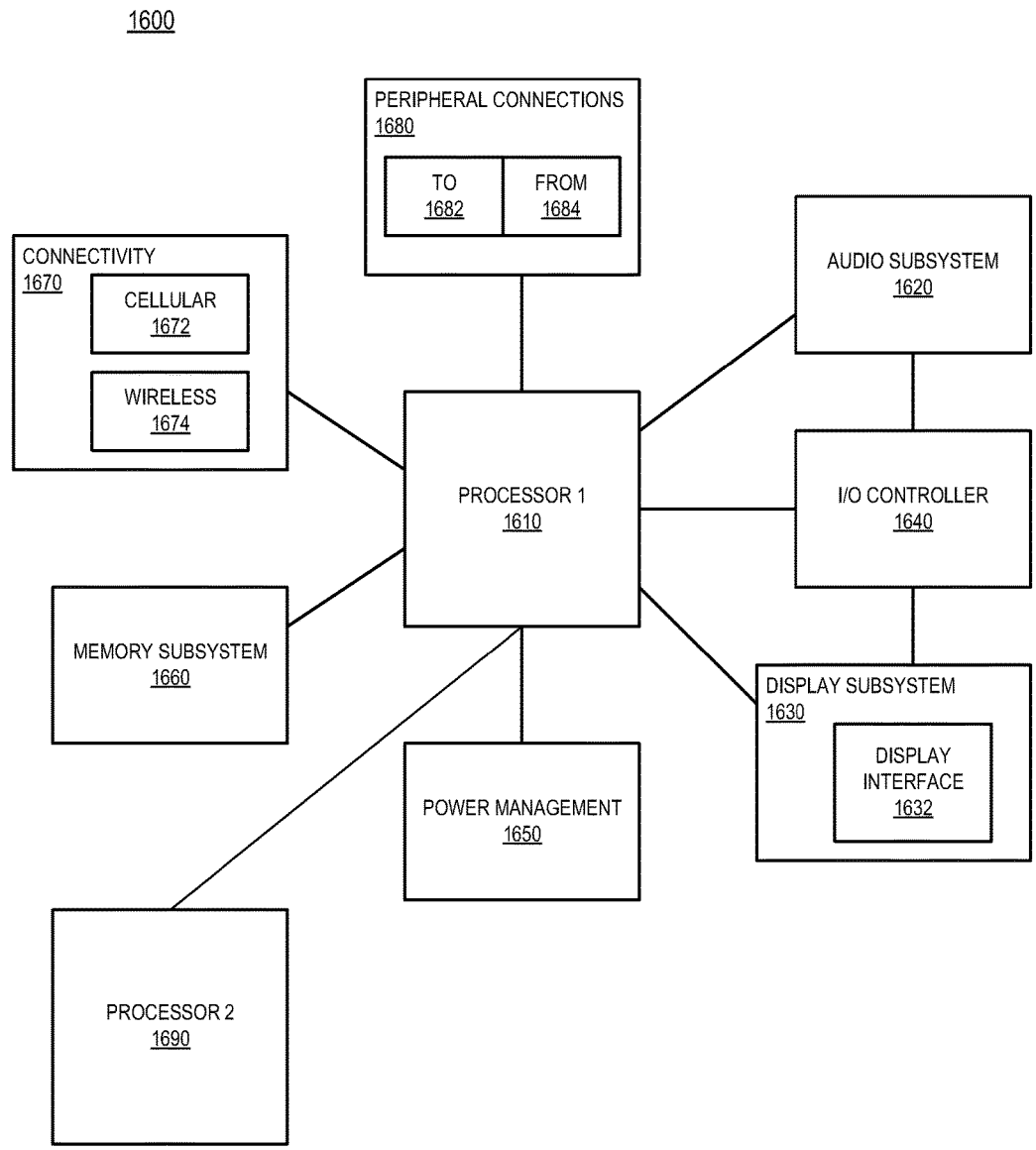
FIG. 7 is a smart device or a computer system or an SoC (System-on-Chip) with a PUF circuit using a resistive memory device, according to one embodiment of the disclosure.

FIG. 7 is a smart device or a computer system or a SoC (System-on-Chip) with a PUF circuit using a resistive memory device, according to one embodiment of the disclosure. It is pointed out that those elements of FIG. 7 having the same reference numbers (or names) as the elements of any other figure can operate or function in any manner similar to that described, but are not limited to such.

FIG. 7 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 apparatus with a PUF circuit using a resistive memory device described with reference to embodiments. Other blocks of the computing device 1600 may also include apparatus with a PUF circuit using a resistive memory device described with reference to embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. Processor 1690 may be optional. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a resistive memory device having at least two terminals; a transistor coupled to one of the at least two terminals of the resistive memory device; and an analog-to-digital converter (ADC) having an input coupled to the one of the at least two terminals of the resistive memory device. In one embodiment, the resistive memory device is an MTJ device. In one embodiment, the ADC is one of: a 1-bit comparator, or a multi-bit ADC. In one embodiment, the transistor has a gate terminal coupled to a word-line. In one embodiment, the transistor is an n-type transistor. In one embodiment, the transistor is coupled to a source line. In one embodiment, the apparatus further comprises a logic to receive output of the ADC to generate an authentication signature.

In another example, a system is provided which comprises: a memory and a processor coupled to the memory, the processor comprising an apparatus according the apparatus discussed above. In one embodiment, the system further comprises: a wireless interface for allowing the processor to communicate with another device. In one embodiment, the system further comprises a display unit. In one embodiment, the display unit is a touch screen.

In another example, an apparatus is provided which comprises: a plurality of resistive memory device based bit-cells, each bit-cell independently controllable; an analog multiplexer coupled to each bit-cell; and an analog-to-digital converter (ADC) to convert an output of the analog multiplexer to a digital representation. In one embodiment, the analog multiplexer is controllable by a select bus. In one embodiment, the apparatus further comprises a first logic unit to change bit values of the select bus over different clock cycles. In one embodiment, the ADC is a multi-bit ADC, and wherein the digital representation from the ADC is a multi-bit bus. In one embodiment, the apparatus further comprises a second logic unit to convert a value of the multi-bit bus into an authentication signature.

In another example, a system is provided which comprises: a memory and a processor coupled to the memory, the processor comprising an apparatus according the apparatus discussed above. In one embodiment, the system further comprises: a wireless interface for allowing the processor to communicate with another device. In one embodiment, the system further comprises a display unit. In one embodiment, the display unit is a touch screen.

In another example, an apparatus is provided which comprises: a plurality of resistive memory device based bit-cells, each resistive memory device based bit-cell independently controllable, and each resistive memory device based bit-cell having first and second terminals such that the first terminal is coupled to a resistive memory device and the second terminal is coupled to a transistor; and an auto-zeroing comparator having an input coupled to one of the first or second terminals of all resistive memory device based bit-cells.

In one embodiment, the auto-zeroing comparator comprises: a first inverter having an input coupled to one of the first or second terminals of all resistive memory device based bit cells; and a switching capacitor coupled in parallel to the first inverter. In one embodiment, the auto-zeroing comparator comprises a second inverter coupled in series with the first inverter. In one embodiment, source terminals of all the transistors of the resistive memory device based bit-cells is coupled to ground when the input of the auto-zeroing comparator is coupled to the first terminal of all resistive memory device based bit-cells. In one embodiment, the first terminal of all resistive memory device based bit-cells is coupled to ground when source terminals of all the transistors of the resistive memory device based bit-cells are coupled to the input of the auto-zeroing comparator.

In another example, a system is provided which comprises: a memory and a processor coupled to the memory, the processor comprising an apparatus according the apparatus discussed above. In one embodiment, the system further comprises: a wireless interface for allowing the processor to communicate with another device. In one embodiment, the system further comprises a display unit. In one embodiment, the display unit is a touch screen.

In another example, an apparatus is provided which comprises: an array of physically unclonable functional (PUF) circuits, each comprising: a plurality of resistive memory device based bit-cells, each resistive memory device based bit-cell independently controllable, and each resistive memory device based bit-cell having first and second terminals such that the first terminal is coupled to a resistive memory device and the second terminal is coupled to a transistor; and an auto-zeroing comparator having an input coupled to one of the first or second terminals of all resistive memory device based bit-cells.

In another example, a system is provided which comprises: a memory and a processor coupled to the memory, the processor comprising an apparatus according the apparatus discussed above. In one embodiment, the system further comprises: a wireless interface for allowing the processor to communicate with another device. In one embodiment, the system further comprises a display unit. In one embodiment, the display unit is a touch screen.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a resistive memory device having at least two terminals;
   a transistor coupled to one of the at least two terminals of the resistive memory device;
   an analog-to-digital converter (ADC) having an input coupled to the one of the at least two terminals of the resistive memory device; and
   a logic to receive an output of the ADC to generate an authentication signature.

2. The apparatus of claim 1, wherein the resistive memory device is an MTJ device.

3. The apparatus of claim 1, wherein the ADC is one of: a 1-bit comparator, or a multi-bit ADC.

4. The apparatus of claim 1, wherein the transistor has a gate terminal coupled to a word-line.

5. The apparatus of claim 1, wherein the transistor is an n-type transistor.

6. The apparatus of claim 1, wherein the transistor is coupled to a source line.

7. An apparatus comprising:
a plurality of resistive memory device based bit-cells, each bit-cell independently controllable;
an analog multiplexer coupled to each bit-cell; and
an analog-to-digital converter (ADC) to convert an output of the analog multiplexer to a digital representation, wherein the digital representation is an authentication signature.

8. The apparatus of claim 7, wherein the analog multiplexer is controllable by a select bus.

9. The apparatus of claim 8 further comprises a first logic unit to change bit values of the select bus over different clock cycles.

10. The apparatus of claim 7, wherein the ADC is a multi-bit ADC, and wherein the digital representation from the ADC is a multi-bit bus.

11. The apparatus of claim 10 further comprises a second logic unit to convert a value of the multi-bit bus into the authentication signature.

12. A system comprising:
a memory;
a processor coupled to the memory, the processor comprising an apparatus which includes:
a resistive memory device having at least two terminals;
a transistor coupled to one of the at least two terminals of the resistive memory device; and
an analog-to-digital converter (ADC) having an input coupled to the one of the at least two terminals of the resistive memory device;
a logic to receive output of the ADC to generate an authentication signature; and
a wireless interface for allowing the processor to communicate with another device.

13. The system of claim 12 further comprises a display unit.

14. The system of claim 12, wherein the resistive memory device is an MTJ device.

15. The system of claim 12, wherein the ADC is one of: a 1-bit comparator, or a multi-bit ADC.

16. The system of claim 12, wherein the transistor has a gate terminal coupled to a word-line.

17. The system of claim 12, wherein the transistor is an n-type transistor.

18. The system of claim 12, wherein the transistor is coupled to a source line.

* * * * *